United States Patent [19]
Kim

[11] Patent Number: 5,862,567
[45] Date of Patent: Jan. 26, 1999

[54] WINDSHIELD WIPER FOR A CAR

[76] Inventor: Duck Soo Kim, 6-87, Insa-dong, Jinhae-city, Kyungsangnam-do, Rep. of Korea

[21] Appl. No.: 984,833

[22] Filed: Dec. 4, 1997

[30]   Foreign Application Priority Data

Dec. 18, 1996 [KR] Rep. of Korea ..................... U9651031
Nov. 19, 1997 [KR] Rep. of Korea ..................... P9761134

[51] Int. Cl.⁶ ..................................................... B60S 1/38
[52] U.S. Cl. ............................... 15/250.201; 15/250.453; 15/250.44; 15/250; 15/351
[58] Field of Search ............. 15/250.44, 250.43, 15/250.451, 250.452, 250.453, 250.454, 250.46, 250.201, 250.351

[56]   References Cited

U.S. PATENT DOCUMENTS

| | | | |
|---|---|---|---|
| 3,103,687 | 9/1963 | Golub et al. ........................ | 15/250.453 |
| 4,180,885 | 1/1980 | Thornton et al. .................... | 15/250.46 |
| 4,794,664 | 1/1989 | Arai ..................................... | 15/250.46 |

FOREIGN PATENT DOCUMENTS

| | | | |
|---|---|---|---|
| 3343318 | 6/1985 | Germany ........................... | 15/250.201 |
| 3842586 | 7/1989 | Germany ........................... | 15/250.453 |

*Primary Examiner*—Gary K. Graham
*Attorney, Agent, or Firm*—Ladas & Parry

[57]   ABSTRACT

A windshield wiper for a car which can wipe wetness or dust stuck on the windshield surface almost completely with a firm pressing pressure. The windshield wiper presses plurality of pressing spots on a curved windshield to wipe efficiently the curved windshield surface. With the windshield wiper, it is possible to replace only the wiper blade when the performance of the wiper blade lowers.

6 Claims, 5 Drawing Sheets

WINDSHIELD WIPER FOR A CAR

BACKGROUND OF THE INVENTION

The present invention relates to a windshield wiper for a car, and more particularly to a windshield wiper for a car which improves the structure of the windshield wiper wiping a front and rear windshield, of which the wiper blade wiping the windshield surface being replaceable, and which has a pressing structure that can eliminate the dust or wetness stuck on the windshield surface as the windshield wiper operates.

A windshield wiper wiping the windshield surface that can be dimmed by some dust or wetness in driving is disposed on the front or rear windshield to make sure of a secure view of a driver.

A driver can make sure of a secure view by wiping the windshield surface using a windshield wiper when rain or snow, and the like is stuck on the windshield before driving.

Thus, this windshield wiper is one of the items that should be checked indispensably before driving in order to cope with unexpected sudden changes in weather that may happen in driving even though the windshield is not used always in driving. Additionally, a general maintenance manual says that the wiper blade wiping the windshield surface should be replaced every 5,000 km's driving.

In the structure of a windshield wiper generally used in a present car, as shown in FIG. 2, one end of an arm(20) of a windshield wiper is coupled to a driving shaft (not shown) of a driving motor provided in an engine room of a car, and a first pressing member(22) is coupled to the other end of the arm(20) by a first hinge(26). Several second pressing member(24) is coupled respectively to the bottom side of each end of the first pressing member(22). As shown in FIG. 2, a gripper(24a) for gripping a upper end of a wiper blade(32) fixedly is formed at the bottom end of the second pressing member(24).

In a windshield wiper consisted like this, because the second pressing member (24) presses the wiper blade(32) on relatively small numbers of spots(positions designated as a, b, c, d in FIG. 1), the pressure with which the pressing member presses on the windshield may be a weak pressure, so the pressing members can not wipe the windshield surface having any curvature effectively. Furthermore, in case there exists a need to replace the wiper blade(32) due to dropping of performance after being used for a certain period, plurality of pressing members coupled each other and the whole wiper blade must be replaced, whereby materials' waste and customers' burden will be raised. In this case, a driver does not carry out the maintenance described above, whereby danger of a traffic accident may exists. Additionally, because the arm(20) disposed in the motor described above will not be replaced, the color between a newly replaced pressing member and a used arm(20) does not match. To minimize such a color difference, windshield wiper is generally colored in black, which limits the windshield wiper to be colored substantially with the same color applied to a car.

Accordingly, it is an object of the present invention to provide a windshield wiper having a structure in which a wiper blade can be adhered closely on the windshield surface along the curvature of the windshield.

It is another object of the present invention to provide a windshield wiper in which only a wiper blade can be replaced every certain driving distance, whereby lessening the burden of a customer, and preventing unnecessary waste of materials.

It is still another object of the present invention to provide a windshield wiper in which the color of the windshield wiper can be applied with the same color of a car, which permits an integral feeling of the windshield with respect to the car visually.

In accordance with one aspect of the present invention there is provided a windshield wiper having a wiper blade for wiping a windshield surface, and an arm being coupled to a driving means such that one end of the arm being driven by the driving means, the windshield wiper comprises a first pressing member, a portion of the first pressing member being coupled to other end of the arm by a first hinge, a pair of second pressing member, a portion of the second pressing member being coupled to underside of both ends of the first pressing member by a second hinge, a pair of third pressing member, a portion of the third pressing member being coupled to underside of outer end of the pressing member by a third hinge, and a holder for holding upper end of the wiper blade, wherein a second gripper formed at underside of an inner end of the second pressing member and also formed at underside of both ends of the third pressing member being separably combined with the holder.

In accordance with another aspect of the present invention there is provided a windshield wiper wherein a first gripper separably combined with a flange formed at upper end of the wiper blade is formed at underside of the holder, and a pair of guide groove slidingly and separably combined with each second gripper of the second pressing member and third pressing member is formed at both outer sides of the holder.

In accordance with still another aspect of the present invention there is provided a windshield wiper, wherein the holder is a flexible material to be bent freely along a curved windshield surface.

In accordance with a further aspect of the present invention there is provided a windshield wiper, wherein the second hinge includes a pair of first hinge pin formed extendedly outward in lateral direction with respect to the first pressing member at both ends of the first pressing member, a first recess formed on the second pressing member to receive at least a portion of the underside of both ends of the first pressing member, and a first hinge recess formed in the first recess to be combined pivotally with the first hinge pin.

In accordance with still further aspect of the present invention there is provided a windshield wiper, wherein the third hinge includes a pair of second hinge pin formed extendedly outward in lateral direction with respect to the second pressing member at both ends of the second pressing member, a second recess formed on the third pressing member to receive at least a portion of the underside of both ends of the second pressing member, and a second hinge recess formed in the second recess to be combined pivotally with the second hinge pin.

In accordance with other aspect of the present invention there is provided a windshield wiper, wherein a spoiler having a curvature being curved down toward the windshield is formed on the arm to cause the arm to apply pressing force against the surface of the windshield.

In accordance with another aspect of the present invention there is provided a windshield wiper, wherein a locking means being locked and unlocked with a locking hole formed in the holder is provided in the third pressing member to prevent the wiper blade from escaping from the holder in lateral direction.

The characteristics of the present invention will be understood more fully from the following detail description and accompanying drawings showing a preferred embodiment of the invention.

DETAILED DESCRIPTION OF THE INVENTION

Figure 2:
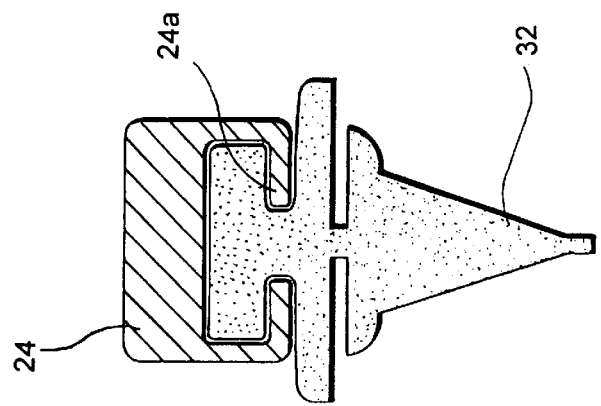
FIG. 2 is a section view of line 2—2 in FIG. 1.
Figure 1:
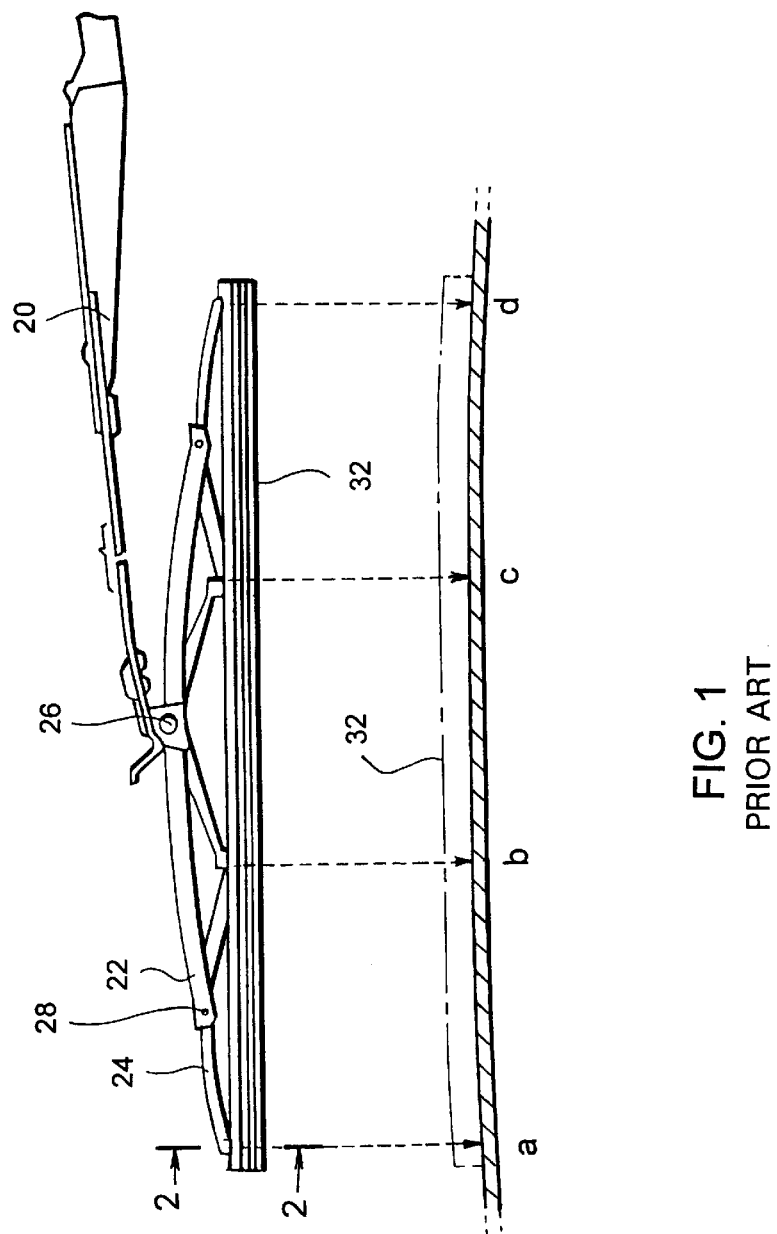
FIG. 1 is a front view showing a windshield wiper according to a prior art.
Figure 3:
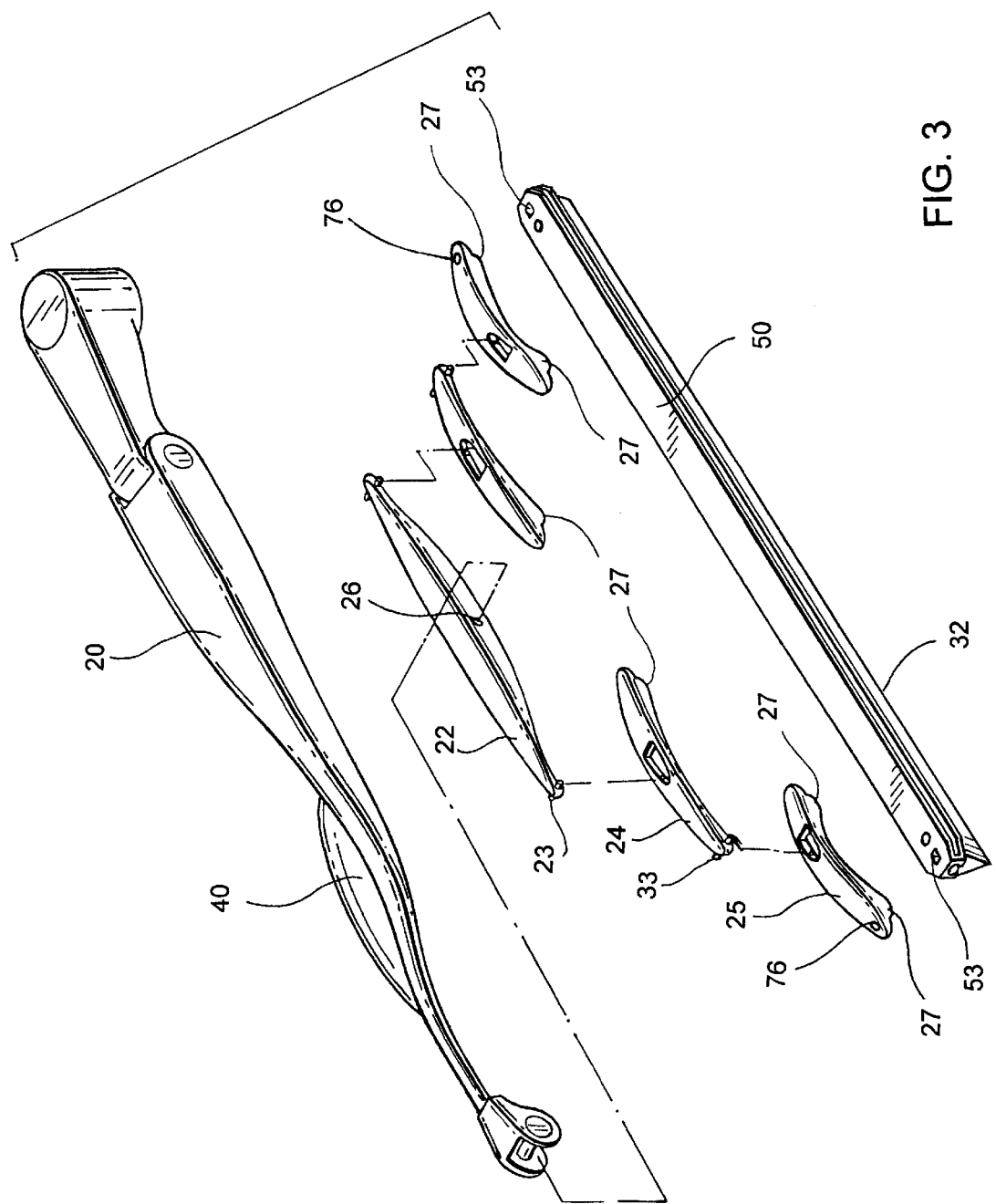
FIG. 3 is an exploded perspective view showing a windshield wiper according to a preferred embodiment of the present invention.
Figure 4:
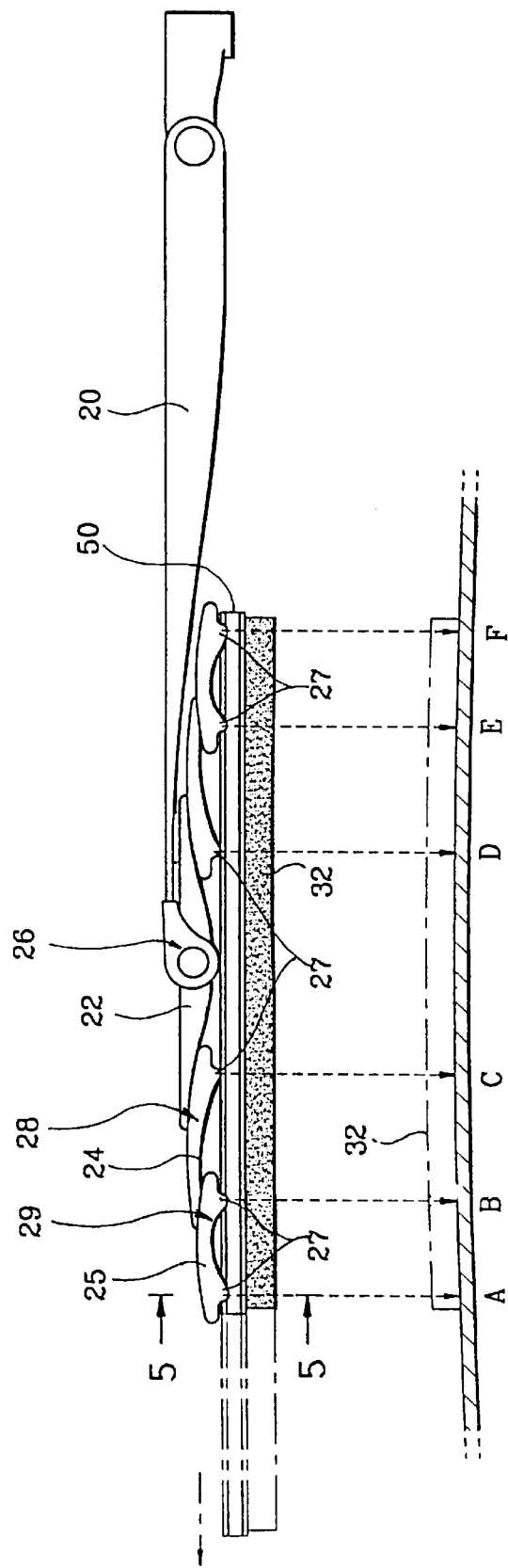
FIG. 4 is a front view showing a windshield wiper according to a preferred embodiment of the present invention.

FIG. 3 show a windshield wiper according to a preferred embodiment of the present invention. As shown, one end of an arm(20) is coupled to a driving shaft (not shown) of a driving motor to have certain turning radius. A portion, preferably a center portion of a first pressing member(22) is coupled to other end of the arm(20) by a first hinge(26), and a portion of a pair of second pressing member(24) is coupled to underside of each end of the first pressing member(22) by a second hinge(28) (see FIG. 4). Additionally, a portion of a pair of third pressing member(25) is coupled to each outer underside of the second pressing member(24) by a third hinge(29) (see FIG. 4). A holder(50) for holding upper end of a wiper blade(32) is located at underside of the third pressing member(25). Preferably, the first pressing member (22), the second pressing member(24), and the third pressing member(25) may be made of a material having resiliency.

Figure 5:
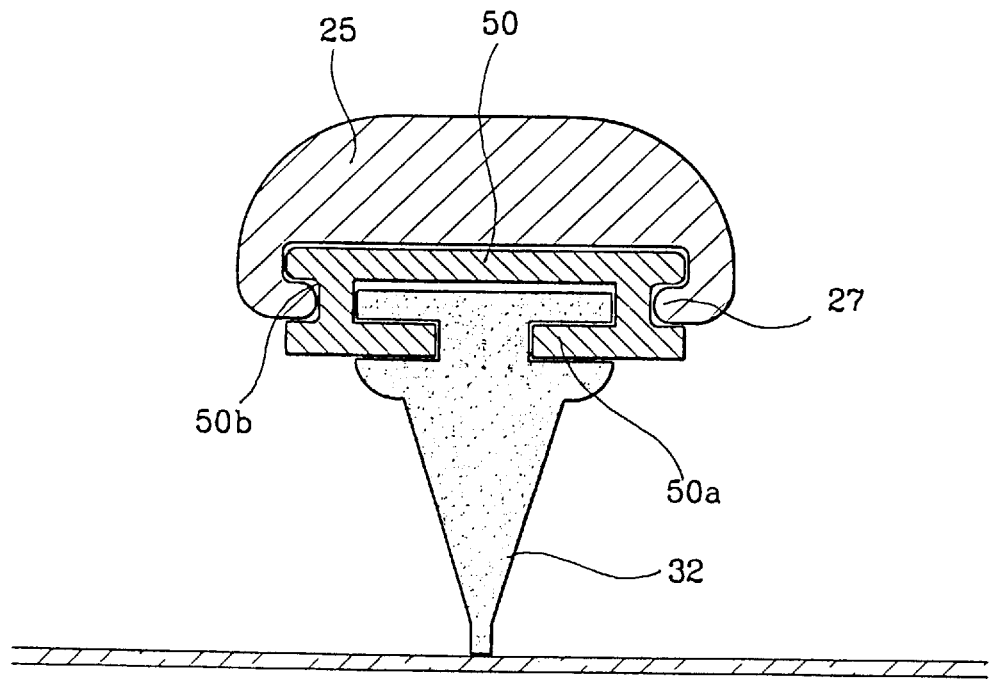
FIG. 5 is a section view of line 5—5 in FIG. 4.

A second gripper(27) is formed respectively at inner underside of the second pressing member(24). In a similar way, a second gripper(27) is formed at underside of both ends of the third pressing member(25) as well (see FIG. 4). As shown in FIG. 5, each second gripper(27) is combined separably with the holder(50). A pair of first grippers(50a) combined separably with a flange(33) formed in upper end of the wiper blade(32) are formed at underside of the holder(50). Additionally, a pair of guide grooves(50b) combined separably with each second gripper(27) of the second pressing members(24) and the third pressing members(25) are formed at each outer side of the holder(50). The holder (50) may be made of a resilient material which can be bent freely along the curved surface of the windshield.

Figure 6:
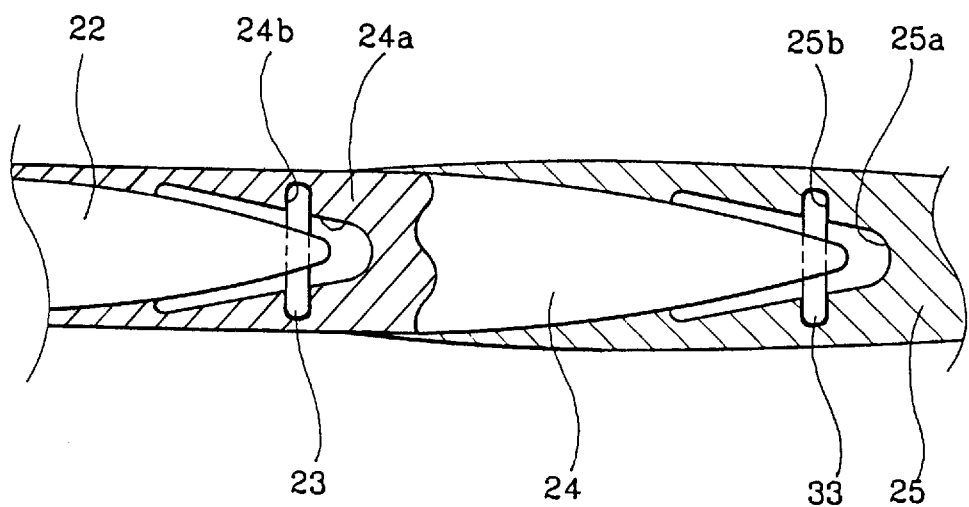
FIG. 6 is a partial section view showing a assembling structure of a hinge according to a preferred embodiment of the present invention.

The second hinges(28), as shown in FIG. 6, includes a pair of first hinge pins(23) formed extendedly outward in lateral direction with respect to the first pressing member (22) at both ends of the first pressing member(22), a first recess(24a) formed on the second pressing members(24) to receive at least a portion of the underside of both ends of the first pressing member(22), and a first hinge recess(24b) formed in the first recess(24a) to be combined pivotally with the first hinge pin(23). Similarly, the third hinge(29) includes a pair of second hinge pin(33) formed extendedly outward in lateral direction with respect to the second pressing member(24) at both ends of the second pressing member(24), a second recess(25a) formed on the third pressing member(25) to receive at least a portion of the underside of both ends of the second pressing member(24), and a second hinge recess(25b) formed in the second recess (25a) to be combined pivotally with the second hinge pin(33).

Figure 7:
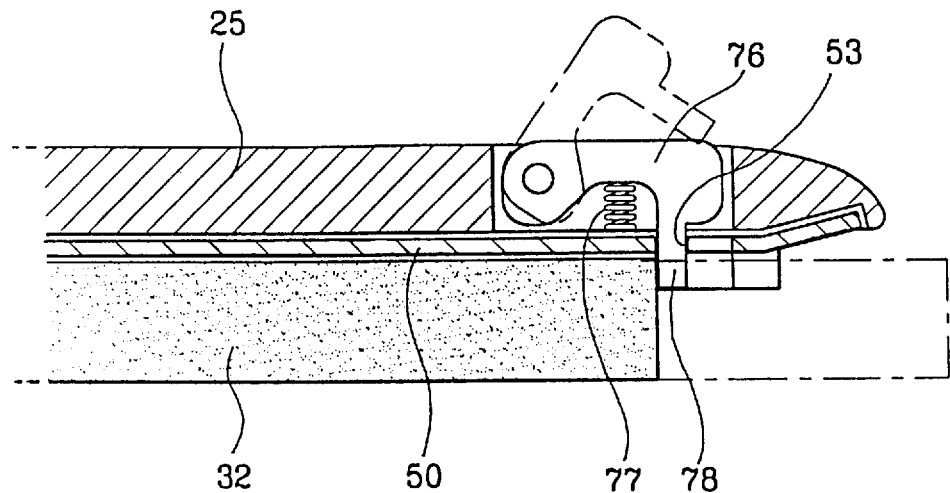
FIG. 7 is a partial section view showing a locking means of a wiper blade according to a preferred embodiment of the present invention.

As shown in FIG. 7, a locking means(76) being locked and unlocked with a locking hole(53) formed in the holder (50) is provided in the third pressing member(25) to prevent the wiper blade(32) from escaping from the holder(50) in a longitudinal direction. One end of the locking means(76) is pivotally coupled to the third pressing member(25), and a protrusion(78) being locked in the locking hole(53) is formed at other end of the locking member(76). A resilient member(77) may be provided at underside of the locking means(76).

Figure 8:
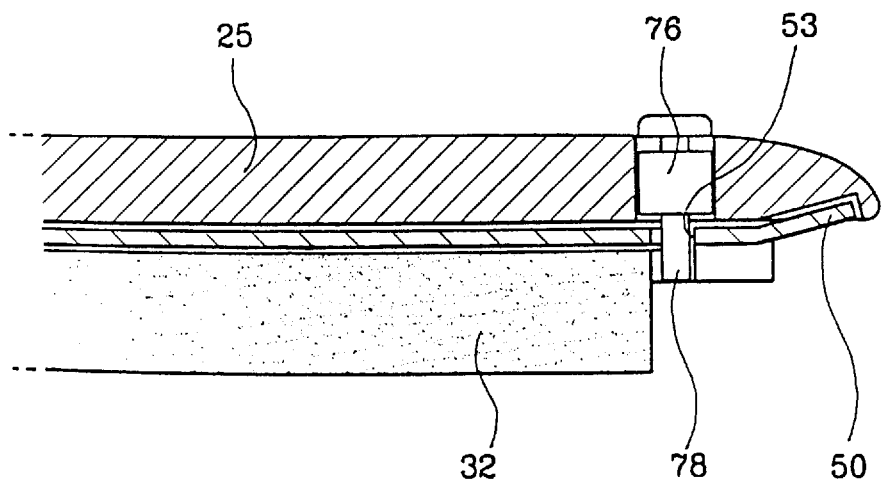
FIG. 8 is a partial section view showing a locking means of a wiper blade according to another preferred embodiment of the present invention.

As shown in FIG. 8, the locking means(76) may be a known push button type means to be locked when pressed and to be unlocked when released. A spoiler(40) having a curvature being curved down toward the windshield may be formed integrally on the arm(20) to cause the arm(20) to apply pressing force against the surface of the windshield. In the preferred embodiment shown in FIG. 3, two locking means (76) are provided on both sides of the third pressing member (25). However, only locking means (76) may be provided at one side of the third pressing member (25), while a simple fixed extension member (not shown) inserted into the locking hole (53) may be provided at the underside of the other side of the third pressing member (25).

Now referring to FIG. 3 again, the windshield wiper according to a preferred embodiment of the present invention has relatively lots of hinges, thus it is possible for the windshield wiper to be turned effectively along the curvature formed on the windshield. Moreover, the wiper blade presses relatively lots of spots (shown as A, B, C, D, E, F in the drawing) on the windshield surface, so the windshield wiper can wipe the windshield surface more efficiently. When the performance wiping the windshield surface lowers, only the wiper blade(32) can be replaced from the pressing members by sliding the wiper blade(32) lateral direction from the holder(50) after unlocking the locking means(77).

As described above, the windshield wiper according to the present invention can wipe wetness or dust stuck on the windshield surface almost completely with a firm pressing of the front or rear windshield surface. It is possible to replace only the wiper blade when the performance of the wiper blade lowers, thus the material may be saved, and not only the amount of the waste may be lessened but burdens of customers may be lessened. Additionally, the color of plurality of pressing members may be applied identical to the color of a car, improving the beauty of the car. Furthermore, the present invention has an advantage that a spoiler may be made integral with the arm in the same color.

It is understood that the foregoing description is only illustrative of the preferred embodiment of the invention. Various alternatives and modifications can be devised by those skilled in the art without departing from the invention. Thus, the present invention is intended to cover all such alternatives and modifications which fall within the scope of the appended claims.

What is claimed is:

1. A windshield wiper having a wiper blade for wiping a windshield surface, and an arm coupled to a driving means such that one end of the arm is driven by the driving means, the windshield wiper comprising:

an elongated first pressing member, a portion of the first pressing member being coupled to another end of the arm by a first hinge, a pair of elongated second pressing members, a portion of the second pressing members being coupled to an underside of both ends of the first pressing member by second hinges, respectively, a pair of third pressing members, a portion of the third pressing members being coupled to an underside of an outer end of the second pressing members by third hinges, respectively, a holder holding an upper end of the wiper blade, wherein a second gripper is formed at an underside of an inner end of both second pressing members and also is formed at an underside of both ends of the third pressing members, said holder being removably supported by said grippers, and locking means lockable and unlockable with a locking hole formed in the holder, said locking means being in at least one of the third pressing members and for preventing the wiper blade from escaping from the holder in a longitudinal direction, said locking means having one end pivotally coupled to the at least one third pressing member and another end having a protrusion lockable in the locking hole.

2. A windshield wiper, as set forth in claim 1, wherein a first gripper separably combined with a flange formed at an upper end of the wiper blade is formed at an underside of the holder, and a pair of guide grooves slidingly and separably combined with each second gripper of the second pressing members and third pressing members are formed at both outer sides of the holder.

3. A windshield wiper, as set forth in claim 1, wherein the holder is of a flexible material bendable freely along a curved windshield surface.

4. A windshield wiper, as set forth in claim 1, wherein each of the second hinges includes a pair of first hinge pins formed extendedly outward in a lateral direction from the first pressing member at both ends of the first pressing member, a first recess formed on each second pressing member to receive at least a portion of the underside of its associated first pressing member, and a first hinge recess formed in each first recess to be combined pivotally with its associated first hinge pin.

5. A windshield wiper, as set forth in claim 1, wherein each of the third hinges includes a pair of second hinge pins formed extendedly outward in a lateral direction from its associated second pressing member, a second recess formed on each third pressing member to receive at least a portion of the underside of its associated second pressing member, and a second hinge recess formed in each second recess to be combined pivotally with its associated second hinge pin.

6. A windshield wiper, as set forth in claim 1, wherein a spoiler having a curvature being curved is formed on the arm to cause the arm to apply pressing force to the blade.

* * * * *